US006911223B2

(12) United States Patent
Morello et al.

(10) Patent No.: US 6,911,223 B2
(45) Date of Patent: *Jun. 28, 2005

(54) BEVERAGES HAVING L-ASCORBIC ACID WITH STABILITY OF COLOR AND CLARITY

(75) Inventors: Michael J. Morello, Cary, IL (US); Susan L. Franz, Arlington Heights, IL (US)

(73) Assignee: Stokely-Van Camp, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/328,468

(22) Filed: Dec. 23, 2002

(65) Prior Publication Data

US 2003/0157220 A1 Aug. 21, 2003

Related U.S. Application Data

(63) Continuation of application No. 09/894,404, filed on Jun. 28, 2001, now abandoned, which is a continuation of application No. 09/495,768, filed on Feb. 1, 2000, now Pat. No. 6,287,611.

(51) Int. Cl.[7] .............................................. A23L 1/302
(52) U.S. Cl. ........................ 426/72; 426/262; 426/268; 426/590; 426/654
(58) Field of Search ........................ 426/72, 590, 262, 426/268, 654

(56) References Cited

U.S. PATENT DOCUMENTS

| 4,132,793 | A | | 1/1979 | Haber et al. |
| 4,820,520 | A | * | 4/1989 | Yokotsuka et al. ......... 426/439 |
| 4,937,085 | A | | 6/1990 | Cherry et al. |
| 5,202,141 | A | | 4/1993 | McEvily et al. |
| 5,336,510 | A | | 8/1994 | Chang |
| 5,681,569 | A | | 10/1997 | Kuznicki et al. |
| 5,738,888 | A | | 4/1998 | Cirigliano et al. |
| 5,773,062 | A | | 6/1998 | Cirigliano et al. |
| 5,851,578 | A | | 12/1998 | Gandhi |
| 5,885,629 | A | * | 3/1999 | Ford .......................... 426/602 |
| 5,895,680 | A | | 4/1999 | Cirigliano et al. |
| 5,895,681 | A | | 4/1999 | Cirigliano et al. |
| 5,989,612 | A | | 11/1999 | King et al. |
| 6,008,250 | A | | 12/1999 | Kurtz et al. |
| 6,106,874 | A | | 8/2000 | Liebrecht et al. |
| 6,287,611 | B1 | * | 9/2001 | Morello et al. ............... 426/72 |

FOREIGN PATENT DOCUMENTS

| JP | 407303466 A | 11/1995 |
| RO | 93941 A | 5/1988 |

OTHER PUBLICATIONS

Hawley, The Condensed Chemical Dictionary, EDTA, 1981, Van nostrand Reinhold co., Inc., 10th Ed., p. 431.*
"Chemistry of L-ascorbic Acid Related to Foods," Liao/Seib, *Food Chemistry*, 1988, Great Britain.
"Thermally Generated Flavors Maillard, Microwave, and Extrusion Process," Parliament/Morello/McGorrin, *ACS Symposium Series, American Chemical Society*, 1994, pp. 131–141.
International Food Information Service (IFIS), Franfurt/Main, DE; AN 1999–00–h0018, Zhao L: "Colour Stability and Protection of Green Tea Beverage".
(abstract) Food Research and Development 19 (1) 29–31 1998 Dep. of Food Sci. & Eng., Normal Coll. of Professional Tech., Henan, China.
*Hach Water Analysis Handbook*, 3rd Edition, p. 524 (attached).

* cited by examiner

*Primary Examiner*—Helen Pratt
(74) *Attorney, Agent, or Firm*—Lars S. Johnson; James D. Ryndak

(57) ABSTRACT

An aqueous beverage solution includes L-ascorbic acid and EDTA. The resulting solution is free of sufficient constituents which could mask color change due to oxidation of the L-ascorbic acid. A color and/or turbidity of the beverage is substantially stable over a desired predetermined time.

34 Claims, No Drawings

BEVERAGES HAVING L-ASCORBIC ACID WITH STABILITY OF COLOR AND CLARITY

REFERENCE TO RELATED APPLICATION

This application is a continuation of U.S. application Ser. No. 09/894,404, filed Jun. 28, 2001, now abandoned, which is a continuation of U.S. application Ser. No. 09/495,768, filed Feb. 1, 2000, now U.S. Pat. No. 6,287,611 B1, the entire disclosure of which is hereby incorporated by reference.

TECHNICAL FIELD

The present invention relates to nutrient-fortified beverages for human consumption, in particular to such beverages being fortified with L-ascorbic acid.

BACKGROUND OF THE INVENTION

In recent years there has been a significant increase in demand for beverages to serve as an alternative to conventional beverages, such as juices and carbonated beverages. More recently, significant interest has arisen for clear and/or colorless beverages. At the same time, there has been a significant interest in beverages which can add health benefits to the consumer beyond re-hydration. In particular, vitamin and/or mineral fortified beverages are of significant interest. One desired vitamin for inclusion in beverages is L-ascorbic acid, or so called vitamin C.

It was proposed by the present inventors to provide clear and/or colorless, and/or light color beverages with vitamin fortification. In particular, it was proposed to include L-ascorbic acid in at least a significant percentage of the U.S. Recommended Daily Requirement of L-ascorbic acid, with other vitamins including B vitamins.

Water solutions of L-ascorbic acid are initially clear and colorless. However, after a period of time, the solutions become discolored and may also become somewhat turbid. It is believed that the discoloration (yellowing or browning) and turbidity occur from reaction products of the L-ascorbic acid according to the following reasons. Small amounts of transition metals, in particular iron, copper, and zinc, present in the water or as impurities in other constituents of a beverage, catalyze oxidation of the L-ascorbic acid. See for example: Ming-Long Liao & Paul A. Seib; *Food Chemistry*, 30 (1988) 289, 312 at 297. Oxidized forms of L-ascorbic acid, commonly referred to as dehydroascorbic acid, are highly susceptible to non-enzymatic browning reactions that lead to a colored (off-color) solution. Certain reaction products can also cloud a clear solution.

It is also known that L-ascorbic acid plays an active role in browning (Maillard) reactions. One of the oxidation products of L-ascorbic acid is threose. It is believed that threose further reacts with nitrogen-containing constituents which may also be in a beverage, such as Aspartame and certain B vitamins (e.g., Niacin and Pantothenic acid). The resulting Maillard reaction products may also cause an undesirable off color change and/or turbidity.

Certain conventional products which contain L-ascorbic acid are not color and/or clarity stable. Other products have co-constituents which mask the color and/or clarity change caused by reaction of the L-ascorbic acid. There are those products too, which may use L-ascorbic acid for other than bioavailability and hence may be at sufficiently low concentrations to cause less of a problem with color and/or clarity change.

Color masking, or more particularly, color change masking, may be provided by natural or synthetic constituents which impart a sufficiently strong color to the aqueous solution. Examples of natural constituents which can mask color change due to oxidation of L-ascorbic acid are: carotenoids; tea or tea components; fruit juice concentrates; carmine red, cochineal extract or combinations of these. Examples of synthetic constituents which can mask color change due to oxidation of L-ascorbic acid are: FD&C dyes; caramel colors; or combinations of same.

Turbidity masking, or more particularly turbidity change masking, may be provided by natural or synthetic constituents which impart a sufficiently strong turbidity to the aqueous solution. Examples of constituents which can mask a change in turbidity or clarity due to oxidation of L-ascorbic acid are: natural fruit or vegetable juice solids, tea, cloudifiers, or combinations of these.

However, a problem is posed for a beverage that would not have constituents strong enough to mask a change in color or turbidity due to oxidation of L-ascorbic acid. A particular problem would be posed for a vitamin C fortified beverage intended to be marketed as clear and colorless. For those consumers seeking such a beverage, any discoloration or turbidity could cause a lack of appeal. A problem would even exist for beverages where some light coloration is either added by design or merely acceptable to consumers. This is because oxidation of L-ascorbic acid takes place over a period of time. Hence, products which are packaged at different times will appear to be different in color and/or clarity. This difference will be more dramatic if the products have different thermal histories during processing and/or storage.

Also, hot filling of a beverage permits reduction or elimination of additives for preventing mold, yeast or other microbes. However, the elevated temperatures experienced during pasteurization are believed to greatly accelerate the oxidation of L-ascorbic acid and hence discoloration. Finally, as noted above, there is a disincentive for adding desirable nutrients such as B vitamins into a proposed color stabile non-masked beverage due to the potential additional discoloration from the Maillard reactions.

U.S. Pat. No. 5,202,141 issued to McEvily, et. al. is directed to the use of at least one substituted resorcinol derivative in combination with an additive to prevent browning in food. Amongst the additives are ascorbic acid and chelating agents including ethylene-diaminetetraacetic acid (EDTA). However, McEvily discloses no criticality or basis for using the two additives together. To the contrary, McEvily discloses the use of ascorbic acid as a reducing agent, which is antithetical to preserving the L-ascorbic acid in a state of bio-availability as vitamin C. More importantly, McEvily discloses that this combination (as well as all other suggested combinations of additives) cannot prevent browning in foods or beverages "that is not initiated by PPO catalysis (i.e., nonenzymatic browning)." (McEvily, Col. 3 lns. 10–11).

U.S. Pat. No. 5,738,888 issued to Cirigliano et. al. is directed to the use of chelating agents including EDTA to prevent the degradation of Natamycin used as an antimicrobial agent in teas.

U.S. Pat. No. 5,336,510 issued to Chang is directed to the use of riboflavin to prevent "decoloring" (bleaching or fading ) of beverages containing L-ascorbic acid and an azo food dye. The riboflavin is used to transfer hydrogen ions from the L-ascorbic acid to oxygen to leave dehydroascorbic acid. The goal in the transfer is to present a preferential reaction to the reduction of the azo dye by the L-ascorbic acid. However, there appears to be no disclosure or concern for the "discoloration" which may be caused by further reaction of the dehydroascorbic acid. This is presumably because of the masking effect of the dye on such discoloration.

The present invention solves the above discussed and other problems for providing a color and clarity stable beverage without the use of masking constituents.

SUMMARY OF THE INVENTION

Aqueous beverage solutions are provided including L-ascorbic acid and EDTA. The solutions are free of sufficient constituents which would mask color change due to oxidation of the L-ascorbic acid. A color of the beverage solutions is substantially stable to visually apparent color change resulting from oxidation of L-ascorbic acid over a desired predetermined shelf life.

According to another aspect of the invention such stable solutions can be packaged, shipped, and stored as water-clear and colorless beverages. According to other aspects of the invention, the above discussed beverage solutions may include a source for B vitamins.

Other advantages and aspects of the present invention will become apparent upon reading the following detailed description of the invention.

DETAILED DESCRIPTION OF PREFERRED EMBODIMENT

While this invention is susceptible of embodiment in many different forms, preferred embodiments of the invention will be described in detail with the understanding that the present disclosure is to be considered as an exemplification of the principles of the invention and is not intended to limit the broad aspect of the invention to the embodiments disclosed. It should also be understood that not every disclosed or contemplated embodiment of the invention needs to utilize all of the various principles disclosed herein to achieve benefits according to the invention.

Preferred beverage solutions according to the invention include an aqueous mixture by weight of: 25 to 50 ppm disodium ethylenediaminetetraacetic acid (EDTA); ascorbic acid may be present in an amount of from about 10 ppm to about 1000 ppm, more particularly about 10 ppm to about 500 ppm, about 25 ppm to about 375 ppm, and 0.5 ppm–125 ppm L-ascorbic acid. It is believed that EDTA chelates transition metal ions, in particular, iron, copper and zinc. In so doing, these ions are not available to catalyze the oxidation of L-ascorbic acid. Hence, any oxidation is slowed to provide an acceptable shelf life. Preferred are beverage solutions having a shelf life of about 30 days to about 300 days.

Preferred solutions also include: 0–12% sucrose; and/or 0–350 ppm Aspartame APM; and/or 0–199 ppm Ace-sulfame-K (AceK); and/or 0–150 ppm sucralose.

Due to the prevention or reduction of oxidation products of L-ascorbic acid (e.g., threose), according to another aspect of the invention, preferred beverages may also include: 1–10 mg/100 mls Niacin; and/or 2.0–25 ppm Pantothenic Acid; and/or 0.5–10 ppm Pyridoxine HCL; and/or 1–20 ppb vitamin B 12.

Beverage solutions made according to the above formulations are water-clear and colorless at the time of filling. The mixtures are blended with conventional techniques and according to the invention may be hot filled for pasteurization. The beverages according to the invention have a preferred pH in the range of about 3.0 to about 5.5, and a more preferred pH in the range of from 3.0 to 4.2, and most preferably a pH of 3.4.

While presently not a preferred embodiment it is believed that advantages according to the invention may still be obtained through cold fill process solutions with appropriate use of an anti-microbial added to the solutions.

It is a goal of the invention to prevent a noticeable or "visually apparent" difference in the color and/or turbidity between individual containers of beverage as a result of the oxidation of L-ascorbic acid. There appears to be no adequate means to visually disclose, in the present specification, a "visually apparent" color or turbidity difference, or a lack thereof. However, it is believed it will be helpful to consider measured values of color in order to get a quantitative feel for the effectiveness of the preferred formulations of the present invention.

Accordingly, Table 1 reports color stability using measured color change over a predetermined time for beverage solutions made according to the preferred formulations described above, including 25 ppm EDTA, and 125 ppm L-ascorbic acid. Also added were: sucrose; Aspartame; AceK; sucralose; Niacin; Pantothenic Acid; Pyridoxine HCL; and vitamin B 12. A control solution was prepared containing the same constituents with the exception of EDTA. The solutions were hot filled into a transparent container and closed.

TABLE 1

| Equivalent Days of Storage @ Room Temperature | ACU, Without EDTA | ACU with EDTA | L*a*b* Color Without EDTA | L*a*b* With EDTA |
|---|---|---|---|---|
| 60 | 16 | 5 | 1.0 b* | 0.10 b* |
| 140 | 70 | 40 | 2.2 b* | 0.10 b* |
| 300 | 90 | 70 | 3.3 b* | 0.80 b* |
| 2 years | 144 | 84 | 4.0 b* | 0.80 b* |

The Apparent Color Units ("ACU") reported in Table 1 were measured according to photometric procedures with Platinum-Cobalt Units Standard solutions as described in *Hach Water Analysis Handbook*, $3^{rd}$ Ed, page 524. Apparent color according to Hach includes color from dissolved materials plus that from suspended matter.

Samples underwent thermal acceleration (heating) at various temperatures. The number of days at room temperature which would be equivalent to the temperature/time that the samples were heat-aged was determined. Table 1 reports those equivalent days. As can be noted, the solutions were substantially stable to color change over the predetermined shelf life or storage times.

The solutions were also measured on a Hunter ColorQuest 45/0 System based on a D65 (Noon Daylight) light source and 10 degree standard observer. Values measured are CIE 1976 L*a*b* (CIELAB) color scales. CIE stands for Commission Internationale de l'Eclairage (the International Commission on Illumination). Reported values are: L* (light/dark); a* (red/green); and b* (yellow/blue). It is noted, however, that minimal changes were measured for L* and a* with respect to both the control and solutions with EDTA. But again, the measured b* values (yellow/blue) being more characteristic of the change of a clear solution due to L-ascorbic acid oxidation show that the EDTA-containing solutions had a substantial increase in stability to color change over the predetermined shelf life or equivalent storage times.

It is well known that measured apparent color values and CIELAB values can vary depending on a variety of factors, not the least of which factors are the methods and apparatus chosen for measurement. This is further reason to point out that disclosure of the color values is not intended to limit the scope of the invention to any given unit or method of measurement for color or turbidity.

Rather, "visually apparent difference," as used herein, means a difference in color and/or turbidity that is readily noticeable upon casually observing solutions of the same or similar formulations side-by-side as might be done by a consumer on a store shelf or refrigerator shelf. A "visually apparent change," as used herein, means that a visually apparent difference exists among containers of beverage having the same or similar formulation but differing ages or thermal histories. The degree of visual difference between the containers would indicate the amount the more colored or the more turbid solution had changed.

Likewise, "stability" or "stable" as used herein, means that there is no visually apparent difference among similar solutions having an age difference equal to a desired predetermined shelf life. In other words, if it is determined that a desired shelf life is 140 days, then a "stable" solution filled into a container 140 days earlier would not have any visually apparent difference in color and/or turbidity than a freshly-filled container of the same or similar formulation according to the invention. Please also note that shelf life as used herein refers only to the criteria of color and/or turbidity.

While the specific embodiments have been illustrated and described, numerous modifications come to mind without significantly departing from the spirit of the invention and it is intended that the scope of protection is only limited by the scope of the accompanying claims.

For example, in the preferred embodiment formulations for clear and colorless still beverages are disclosed. However it is contemplated that formulations having light initial coloring (of any desired color) may be fortified with L-ascorbic acid and color stabilized with EDTA. Likewise, it is contemplated that formulations having light initial clouding may be fortified with L-ascorbic acid and turbidity stabilized with EDTA. It is further contemplated that formulations according to the invention may provide beverage solutions having light initial coloring and an amount of cloudiness or turbidity that would otherwise mask a change in turbidity due to L-ascorbic acid reaction products, even though such masking would not be necessary for that purpose. It is also contemplated that formulations according to the invention may provide beverage solutions having light initial turbidity while having a color sufficiently strong so that it would mask a change in color due to L-ascorbic acid reaction products, even though such masking would not be necessary for that purpose.

What is claimed is:

1. An aqueous beverage comprising:
   water;
   L-ascorbic acid;
   the beverage being free of sufficient constituents which would mask color change due to oxidation of the L-ascorbic acid; and
   a chelator, present in an effective amount for chelating iron, copper and zinc ions to slow oxidation of the L-ascorbic acid so that the color of the beverage is substantially stable for a predetermined time.

2. The beverage of claim 1 wherein said chelator is a salt of ethylenediaminetetraacetic acid.

3. The beverage of claim 1 wherein the chelator is disodium ethylenediaminetetraacetic acid.

4. The beverage of claim 3 comprising beverage from about 25 ppm to about 50 ppm disodium ethylenediaminetetraacetic acid.

5. The beverage of claim 4 comprising from about 0.5 ppm to about 125 ppm L-ascorbic acid.

6. The beverage of claim 4 comprising from about 0.5 ppm to about 500 ppm L-ascorbic acid.

7. The beverage of claim 1 wherein the beverage has an initial color which is substantially colorless.

8. The beverage of claim 1 wherein the beverage has an initial turbidity which is substantially water clear.

9. The beverage of claim 1 comprising from about 0.5 ppm to about 125 ppm L-ascorbic acid.

10. The beverage of claim 1 wherein the predetermined time is in the range of about 30 days to about 300 days.

11. The beverage of claim 1 having a pH in the range of about 3.0 to about 5.5.

12. The beverage of claim 1 comprising from about 10 ppm to about 1000 ppm L-ascorbic acid.

13. The beverage of claim 1 further comprising a sweetener selected from the group consisting of sucrose, aspartame, acesulfame-K, sucralose and combinations thereof.

14. The beverage of claim 1 further comprising a nutrient selected from the group consisting of niacin, pantothenic acid, pyridoxine, vitamin B-12, and combinations thereof.

15. The beverage of claim 1 wherein the beverage is free of sufficient constituents that could mask a turbidity change due to oxidation of L-ascorbic acid.

16. The beverage of claim 15 wherein the beverage is free of carotenoids, tea, tea components, fruit juice concentrates, carmine red, cochineal extract, natural fruit juice solids, natural vegetable juice solids and cloudifiers.

17. The beverage of claim 1 comprising from about 0.5 ppm to about 375 ppm L-ascorbic acid.

18. An aqueous beverage comprising:
   water;
   L-ascorbic acid;
   the beverage being initially substantially water clear and free of sufficient constituents which could mask color change due to oxidation of the L-ascorbic acid and the beverage being free of sufficient constituents that could mask turbidity change due to oxidation of the L-ascorbic acid; and
   a chelator, present in an effective amount for chelating iron, copper and zinc ions to slow oxidation of the L-ascorbic acid so that the color and turbidity of the beverage is substantially stable for a predetermined time.

19. The beverage of claim 18 wherein the predetermined time is at least 90 days.

20. The beverage of claim 18 wherein said chelator is a salt of ethylenediaminetetraacetic acid.

21. The beverage of claim 18 wherein the chelator is disodium ethylenediaminetetraacetic acid.

22. The beverage of claim 21 comprising beverage from about 25 ppm to about 50 ppm disodium ethylenediaminetetraacetic acid.

23. The beverage of claim 18 wherein the beverage has an initial color which is substantially colorless.

24. The beverage of claim 18 comprising from about 0.5 ppm to about 125 ppm L-ascorbic acid.

25. The beverage of claim 1 wherein the predetermined time is in the range of about 30 days to about 300 days.

26. The beverage of claim 18 comprising from about 10 ppm to about 1000 ppm L-ascorbic acid.

27. The beverage of claim 18 further comprising a sweetener selected from the group consisting of sucrose, aspartame, acesulfame-K, sucralose and combinations thereof.

28. The beverage of claim 18 further comprising a nutrient selected from the group consisting of niacin, pantothenic acid, pyridoxine, vitamin B-12, and combinations thereof.

29. The beverage of claim 18 wherein the beverage is free of carotenoids, tea, tea components, fruit juice concentrates, carmine red, cochineal extract, natural fruit juice solids, natural vegetable juice solids and cloudifiers.

30. The beverage of claim 18 comprising from about 10 ppm to about 500 ppm L-ascorbic acid.

31. A method for preparing a visually shelf-stable beverage comprising:

mixing L-ascorbic acid, water and a chelator present in an effective amount for chelating iron, copper and zinc ions to slow oxidation of the L-ascorbic acid so that the color of the beverage is substantially stable for a predetermined period of time to form a substantially clear and colorless beverage, the beverage being free of sufficient constituents which could mask color change due to oxidation of the L-ascorbic acid; and storing the beverage in a visually stable state for a predetermined time.

32. The method of claim 31 further comprising pasteurizing the beverage.

33. The method of claim 31 further comprising adding a sweetener to the beverage.

34. The method of claim 31 further comprising adding a nutrient to the beverage.

* * * * *